H. G. CHATAIN.
INTERNAL COMBUSTION ENGINE.
APPLICATION FILED FEB. 7, 1916.

1,242,142.

Patented Oct. 9, 1917.

Inventor:
Henri G. Chatain,
by: Allen S. Davis
His Attorney.

UNITED STATES PATENT OFFICE.

HENRI G. CHATAIN, OF ERIE, PENNSYLVANIA, ASSIGNOR TO GENERAL ELECTRIC COMPANY, A CORPORATION OF NEW YORK.

INTERNAL-COMBUSTION ENGINE.

1,242,142.　　　　Specification of Letters Patent.　　Patented Oct. 9, 1917.

Application filed February 7, 1916. Serial No. 76,742.

*To all whom it may concern:*

Be it known that I, HENRI G. CHATAIN, a citizen of the United States, residing at Erie, county of Erie, State of Pennsylvania, have invented certain new and useful Improvements in Internal-Combustion Engines, of which following is a specification.

The present invention relates to internal combustion engines and has for one of its objects to provide an improved arrangement of packing for the piston or pistons of such engines.

A further object of my invention is to provide in connection with the piston of an engine a scraper ring, as is fully described hereinafter, the function of which is to scrape back the lubricating oil off the cylinder wall so as to prevent an excessive amount from passing along such wall.

A still further object of my invention is to provide an improved form of packing ring.

For a consideration of what I believe to be novel and my invention, attention is directed to the accompanying description and the claims appended thereto.

Figure 1:
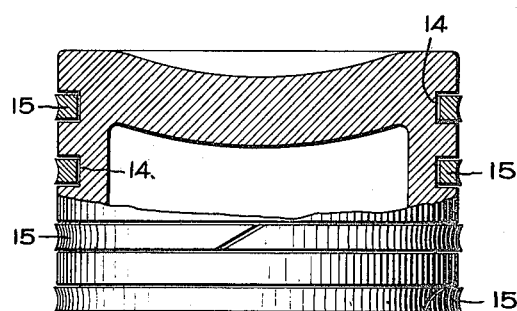
Figure 3:
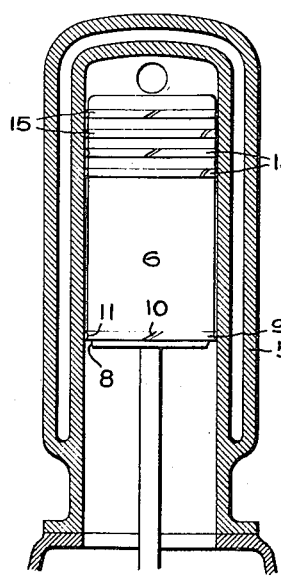
Figure 2:
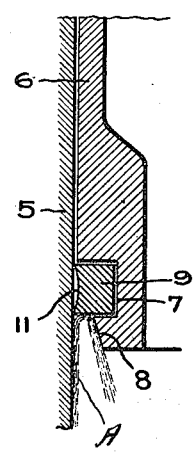

In the accompanying drawing, Figure 1 is a view partly in section and partly broken away of a cylinder embodying my invention; Fig. 2 is a detail view illustrating the operation of the scraper ring, and Fig. 3 is a diagrammatic view showing the piston in connection with a cylinder.

Referring to the drawing, 5 indicates the cylinder, and 6 the piston of an internal combustion engine. In the outer end of the piston is a circumferential groove 7 having its outer edge cut back preferably at an angle as indicated at 8. Arranged in the groove 7 is what I term a scraper ring 9. It comprises a packing ring which may be made of any suitable material split at 10 so as to enable it to be slipped into place. The surface of the packing ring 9, which engages the cylinder wall, is formed to present one or more sharp edges so that it has only line contact with the cylinder wall. To this end the face of the ring is preferably hollow ground as indicated at 11 to provide the two edges 12 and 13. It thus has two lines of contact with the cylinder wall.

At its inner end the piston is provided with the usual grooves 14 to receive packing rings 15. These rings may be of any ordinary construction, but I preferably employ rings of the same structure as the scraper ring. It will be understood, however, that my invention is not limited to this.

When the piston is at the inner end of its stroke, the lubricant is splashed from the crank case against the inner surface of the cylinder. On the out stroke of the piston the scraper ring 9 scrapes along the surface of the cylinder scraping off ahead of it the film of lubricant thereon. This is clearly illustrated in Fig. 2 where A indicates the oil film. It will be understood that this view is somewhat exaggerated for purposes of illustration.

This structure of packing ring has the advantage that it will wear into place much more rapidly than it would if the peripheral surface were flat, as in the ordinary construction; and a close running fit can be more easily obtained, since as the edges wear down readily the rings can be made originally very slightly over size.

The construction also has the advantage that small particles of lubricant can collect in the hollow of the ring, which has the effect of producing a better and tighter packing and also of providing better lubrication of the engaging parts.

I have found by actual tests that my improved structure, wherein I use a scraper ring, is much more economical of lubricant. For example, I have found in the case of a gas electric car, that I can obtain about twice the mileage per gallon of lubricating oil with my improved arrangement than with the ordinary arrangement heretofore used.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with the cylinder of an internal combustion engine, of a piston therein having circumferential grooves, and split spring packing rings in said grooves, said packing rings being hollow ground on their outer surfaces so that each presents two sharp edges to the cylinder wall which have a line contact therewith.

2. The combination with the cylinder of an internal combustion engine, of a piston therein having a circumferential groove at its outer end, packing rings at the inner end of said piston, and a split spring packing ring in said groove, said last named ring being hollow ground on the outer surface so as to present two sharp edges to the cylinder wall which have a line contact therewith, and acting as an oil scraper.

In witness whereof, I have hereunto set my hand this fourth day of February, 1916.

HENRI G. CHATAIN.